June 11, 1957 H. HEAGERTY 2,795,151
VEHICLE THROTTLE DEPRESSOR
Filed Aug. 3, 1953
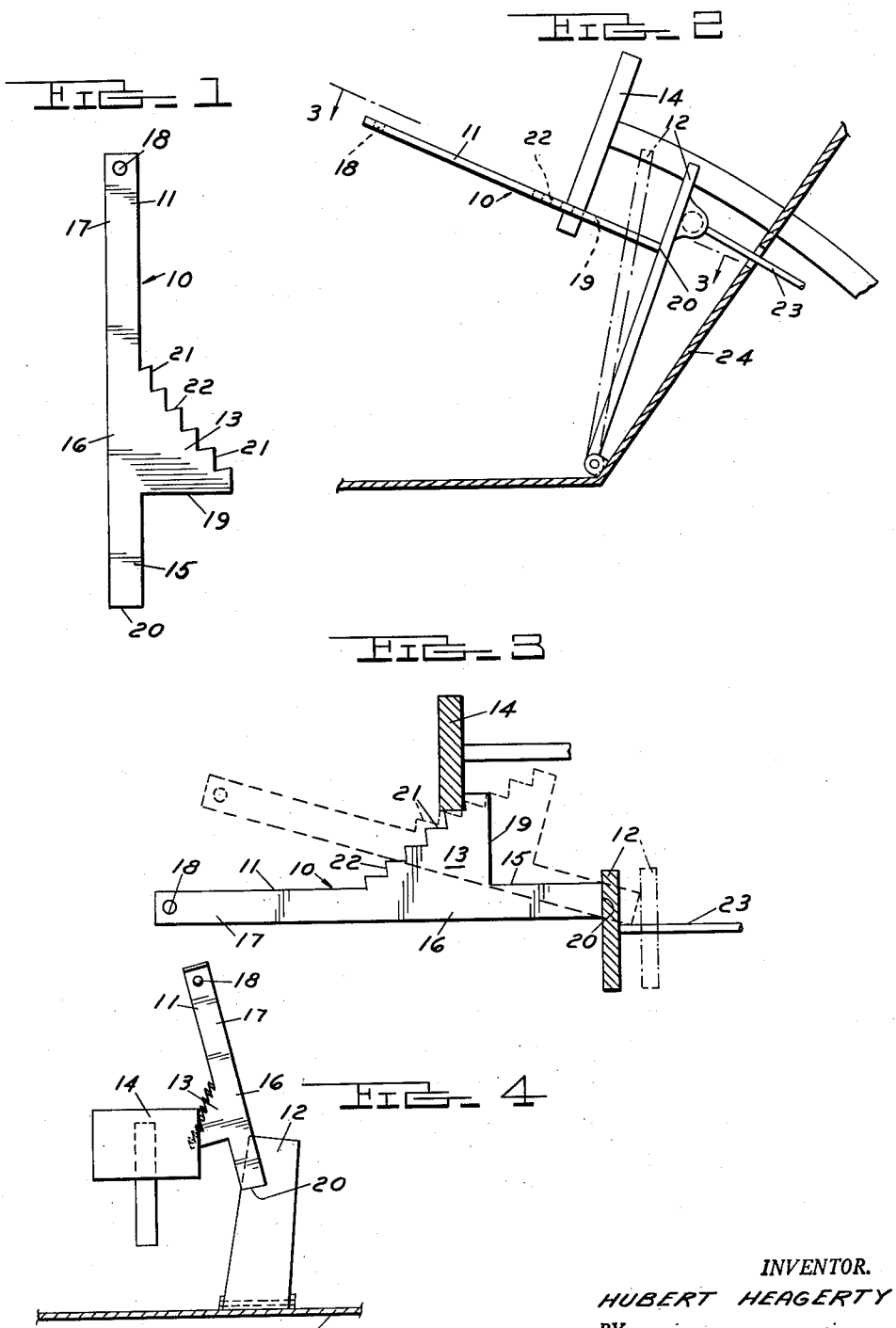
INVENTOR.
HUBERT HEAGERTY
BY
ATTORNEY

United States Patent Office 2,795,151
Patented June 11, 1957

2,795,151

VEHICLE THROTTLE DEPRESSOR

Hubert Heagerty, Royal Oak, Mich.

Application August 3, 1953, Serial No. 371,843

5 Claims. (Cl. 74—482)

This invention relates to automobile foot throttle depressing means and more particularly to manual automobile foot throttle depressing means adapted to be interposed between an automobile foot throttle and foot brake pedal so as to depress the foot throttle and hold it in any one of a plurality of selected positions so that the automobile engine may be operated at any one of a plurality of selected speeds without the necessity of an attendant remaining in the vehicle.

Practically all automobiles being manufactured at the present time do not include a hand throttle which heretofore was usually installed on the vehicle dashboard and which could be set manually to operate the vehicle engine at a desired rate of speed. The absence of the hand throttle has posed a special problem for automobile dealers, particularly those dealers who maintain a stock of used cars, in that the automobile engines must be operated every day to maintain the engines and other parts in good operating condition. As an illustration, if an automobile were permitted to stand without having its engine run fairly regularly for any length of time, the battery would soon become discharged sufficiently that the engine could not be started except by an outside source of electrical energy.

In the case of an automobile dealer who usually has a large number of late model automobiles on hand, sometimes for a considerable period of time, the dealer must either maintain a battery recharger for constant use in recharging batteries or he must utilize one of his employees to start each automobile and run its engine at a sufficiently high rate of speed for a sufficient length of time to charge the battery. When the dealer has a large number of automobiles whose equipment does not include a hand throttle, the employee must remain in each automobile and keep the foot throttle depressed for the full period of engine operation for each automobile.

Either of the above mentioned methods of overcoming the problem of keeping the automobiles in good operating condition obviously is an expensive and time consuming procedure which is unsatisfactory for many reasons. In the winter, moreover, an employee is inclined to slight his duties of operating the engine of each automobile for a sufficient length of time due to the cold weather and, therefore, the engine oil is quite likely not to become sufficiently warm to properly lubricate the engine with the result that not only is the battery inadequately charged but also considerable damage may be done to the engine of the vehicle.

With the foregoing in view, therefore, it is an object of this invention to provide manual means for setting the foot throttle of a vehicle not equipped with a hand throttle so that the vehicle engine may be periodically operated at a sufficient rate of speed to maintain the engine in good operating condition.

Another object of the invention is to provide manual means for setting the foot throttle of a vehicle and which, after being set, does not require personal attendance.

Another object of the invention is to provide manual means for setting the foot throttle of a vehicle, the throttle setting means being adapted for use on a multitude of different makes of vehicles.

Another object of the invention is to provide manual means for setting a vehicle foot throttle, the manual means being adapted to set the throttle in any one of a plurality of selective positions.

A further object of the invention is to provide manual means for setting a vehicle foot throttle which is inexpensive yet rugged and durable in construction, and simple to use.

These and further objects and advantages of the invention either will be specifically pointed out or will become apparent from the following specifications when considered in conjunction with the accompanying drawings in which:

Fig. 1 is a front elevational view of the prop constituting the manual throttle setting means;

Fig. 2 is a side view, partly in cross-section, illustrating the throttle depressor in operation;

Fig. 3 is a view taken on the line 3—3 of Fig. 2; and

Fig. 4 is a view of the installed throttle depressor as it would appear when looking forwardly from the driver's seat of a vehicle.

Referring now to the drawings wherein like numerals represent like and corresponding parts throughout the several views, the embodiment of the invention shown therein for illustrative purposes comprises in general a vehicle throttle depressor 10 having an elongated prop element 11 adapted to be positioned atop a vehicle foot throttle 12, the prop element having a wing 13 extending laterally from the prop and adapted to engage the underside of a vehicle brake pedal 14 to maintain the throttle depressor 10 in operative position.

More particularly, the vehicle throttle depressor 10 comprises an elongated, preferably thin and light weight prop element 11 of a suitable length. The prop 11 may be said to have three distinct portions: a foot or throttle engaging portion 15, a wing supporting or brake pedal engaging portion 16, and a handle portion 17 which latter portion may be provided with suitable means such as an aperture 18 for hanging the throttle depressor in a convenient place when not in use.

Adjacent the wing supporting or brake pedal engaging portion 16 of the prop 17 and preferably integrally formed therewith is a substantially triangularly shaped wing 13 extending from one side thereof. The base 19 of the wing 13 is disposed at right angles to the prop 11 and is positioned at approximately one-fourth the length of the prop above the bottom or throttle engaging portion 20 thereof. The wing 13 extends to a height substantially at the center of the prop 11 as shown in the drawings but it will be understood that the dimensions herein given are by way of example only.

The free side of the wing 13 is provided with a suitable plurality of steps or teeth 21, each of which has its tread portion 22 disposed at an angle to the plane of the wing base 19 for a purpose to be explained subsequently.

To use the throttle depressor, the automobile engine is started and the throttle depressor inserted between the throttle 12 and the brake pedal 14. To insert the throttle depressor in the proper position, the user grasps the handle portion 17 and places the throttle engaging portion 20 against the throttle 12. With the wing 13 projecting toward the brake pedal 14, the user depresses the throttle 12 until the vehicle engine is operating at the desired rate of speed to warm the engine and charge the battery. At this point the throttle depressor 10 is inclined toward the brake pedal 14 so that one of the teeth 21 has its tread 22 positioned beneath the pedal 14. The usual spring (not shown) which surrounds the throttle linkage 23 between the throttle pedal 12 and the vehicle floor board 24 urges the throttle pedal 14 upwardly to the position shown in dash-dot lines in Fig. 2 so as to retain the throttle depressor in position between the brake pedal and the throttle pedal.

Because each of the step treads 22 is disposed at an angle, the tread which engages the under side of the brake pedal has practically a continuous frictional contact therewith. Because of the light weight of the throttle depressor and because of the frictional engagement of the step tread 22 with the brake pedal there is little likelihood that an installed throttle depressor will twist and become displaced.

If it should be desired to operate the vehicle engine at a different rate of speed, say, somewhat faster, all that need be done is depress the throttle and incline the depressor 10 until a higher tooth 21 is in position to contact the under side of the brake pedal 14. This adjustment is illustrated in Fig. 3. To reduce the speed of the engine, the reverse of the procedure just outlined is followed.

Automobile dealers usually have their vehicles arranged in rows or lines of several vehicles. Where this is the situation, an attendant may supply himself with a number of throttle depressors equal to the number of vehicles in a row and begin to perform his duties by starting the engine of the first vehicle and inserting the throttle depressor between the throttle pedal and the brake pedal in the manner hereinbefore described to operate the engine at the desired rate of speed. With the first vehicle in operation, the attendant may then proceed to the second vehicle and set its engine to operate at the desired rate of speed. This procedure should be repeated until all vehicles in the row are operating.

At the end of the first row of vehicles, the first vehicle ordinarily will have had its engine operating for a sufficient length of time to accomplish the desired objectives. This being the case, the attendant may transfer the throttle depressor from the first vehicle of the first row to the first vehicle of the second row and repeat this procedure with the second and subsequent vehicles until all of the vehicles in the second row have their engines operating. Obviously, this method may continue until all vehicles are operated a sufficient length of time.

When using the throttle depressor as outlined above a single attendant may care for a large number of vehicles in a fraction of the time now required. Thus, the automobile dealer is able to realize a saving of labor time and expense while at the same time being assured of proper maintenance of his vehicles with a resulting saving of repair and replacement costs.

The disclosure of the invention to this point has concerned itself primarily with advantages to be obtained by automobile dealers. It is obvious, however, that the invention has utility in many situations such as in automobile repair shops where a vehicle engine is desired to be operated at a speed faster than idling speed to enable a mechanic to make engine adjustments and repairs. It is also contempated that the invention will find acceptance by vehicle owners who desire to operate the engine of their vehicle without having to remain therein and keep the foot throttle depressed.

While the invention has been shown and described in detail, it should be understood that this disclosure is intended for illustrative purposes only as the invention obviously is susceptible of modification within the scope of the appended claims.

I claim:
1. A light weight quickly insertable and removable vehicle foot throttle pedal depressor adapted to be inserted between a vehicle foot throttle pedal and a brake pedal, said depressor comprising a throttle pedal engaging portion and a brake pedal engaging portion integrally connected to said throttle pedal engaging portion, said brake pedal portion extending to one side of said throttle pedal engaging portion so as to define a straight line between the top of said throttle pedal and the bottom of said brake pedal.

2. A vehicle pedal throttle depressor as set forth in claim 1 wherein said brake pedal engaging portion is provided with an extension which constitutes a handle for said depressor so that the device can be used from a sitting position on the vehicle front seat.

3. A vehicle foot throttle pedal depressor adapted to be inserted between a vehicle foot throttle pedal and a brake pedal, said depressor comprising a throttle pedal engaging portion, a wing supporting handle portion joined to said throttle pedal engaging portion, and a laterally extending wing supported by said wing supporting handle portion, said wing being adapted to engage the bottom of said brake pedal to retain said throttle pedal engaging portion in engagement with the top of said throttle.

4. A vehicle foot throttle pedal depressor adapted to be inserted between a vehicle foot throttle pedal and a brake pedal, said depressor comprising a throttle pedal engaging portion, a wing supporting upwardly extending handle portion joined to said throttle pedal engaging portion, and a laterally extending notched wing supported by said wing supporting handle portion, said wing being adapted to selectively engage said brake pedal via said notches to retain said throttle pedal engaging portion in engagement with said throttle pedal, said notched wing being capable of engaging said brake pedal in any one of a number of selected positions from an operator sitting position.

5. A light weight quickly insertable and removable automotive throttle pedal depressor and holder insertable and removable by a person in the vehicle front seat in a normal sitting position comprising an upstanding handle portion adapted to extend upwardly a substantial distance above the brake and throttle pedals so that the user can insert the device in the desired location from a sitting position on the front seat, a foot portion located at the bottom of said handle portion adapted to ride on the throttle pedal to exert a downward thrust thereagainst so as to overcome the throttle pedal spring to open the engine throttle a desired amount, a triangulated wing portion spaced above said foot portion projecting sidewise outwardly from said handle portion above said foot portion a maximum distance adjacent said foot portion and tapering to minimum distance upwardly thereof, and stepped tread portions on the upper portions on the upper surface of said wing portion adapted to selectively engage and react against the underside of the vehicle brake pedal to hold the throttle pedal in its depressed condition against upward movement of the throttle pedal.

References Cited in the file of this patent
UNITED STATES PATENTS

| | | |
|---|---|---|
| 789,813 | Longley | May 16, 1905 |
| 1,193,154 | Kirchhoff | Aug. 1, 1916 |
| 1,476,393 | Cowdrey | Dec. 4, 1923 |
| 1,584,712 | Bailey | May 18, 1926 |
| 1,813,426 | Russell | July 7, 1931 |
| 1,853,449 | Navarro | Apr. 12, 1932 |